Jan. 11, 1966     W. R. MARKLEIN     3,228,234

ULTRASONIC INSPECTION METHOD

Filed Jan. 2, 1963

INVENTOR
WILLIAM R. MARKLEIN
BY Kiess
HIS ATTORNEY 3,228,234
ULTRASONIC INSPECTION METHOD
William R. Marklein, Schenectady, N.Y., assignor to General Electric Company, a corporation of New York
Filed Jan. 2, 1963, Ser. No. 249,029
3 Claims. (Cl. 73—67.8)

This invention relates to non-destructive testing of objects for defects or flaws therein, and more particularly to non-destructive testing utilizing ultrasonic wave energy.

Non-destructive testing of objects for defects with ultrasonic wave energy is now widely utilized. However, the previously known techniques of ultarsonic testing have not proved satisfactory in the detection of all types of flaws and all objects. For example, the prior art techniques have proven to be unsatisfactory in the detection of radially oriented flaws in cylindrical forgings, such as generator and turbine rotors and turbine bucket wheels and the like. Existing techniques for detecting flaws of this nature include the use of beam dispersion techniques, immersion testing, and the use of shear waves. Each of these methods, however, has limitations which make many applications of ultrasonic testing impractical.

Beam dispersion techniques, such as are used widely on large rotor forgings, depend upon the beam dispersion characteristics of the electromechanical transducer used, assuming that some portion of the beam will be normal to the discontinuity. In practice, the reliable limit to which this method can detect a purely radially oriented flaw is about 20° off the center line of the beam. The echo returning to the transducer is indicated at greatly reduced amplitude and give no true indication of the size or the orientation of the discontinuity. For this reason, empirical factors are applied to determine the approximate flaw diameter. A separate test at higher frequency is then used to pinpoint the location of the discontinuity.

Immersion testing provides a means of detecting discontinuities of this nature by scanning with angled longitudinal and shear waves. However, the existence of both types of waves simultaneously produces a confusing reflection pattern and, in addition, reflections from fillets and concave surfaces add more difficulties to interpretation. In addition, very precise alignment of the transducer to the work surface is required for reliable results. Therefore, this technique may be suitable for testing relatively small parts of simple geometric configuration, but since the object must be at least partially immersed while testing, this factor alone makes this method economically impractical for testing large forgings.

Shear wave techniques are used to inspect parts with relatively thin walls such as retaining rings, pipes and welded joints. The search units are usually of the fixed type and the shear waves are projected into the object to be tested at a fixed angle. Scanning shoes of "Plexiglas" plastic material suitable for angulating the beam into steel are available, but scanning is limited because the ratio of velocities of propagation of longitudinal waves in "Plexiglas" to that in steel causes the formation of both a longitudinal and shear wave simultaneously at angles below the first critical angle. This produces multiple reflections and makes interpretation of a received signal difficult.

It is accordingly an object of this invention to provide an improved method of non-destructive testing utilizing ultrasonic wave energy.

It is another object of this invention to provide an improved method of non-destructive testing utilizing ultrasonic wave energy in which the ultrasonic beam is at some time normal to any defect which may be within the tested object.

Briefly stated, and in accordance with the broader aspects of the present invention, non-destructive testing of an object for flaws therein is effected by directing a beam of ultrasonic wave energy into the object at a continuously variable angle with respect to the surface of the object, so as to eventually view every portion of the object at an angle normal thereto. Any reflected ultrasonic wave signal from a defect in the object is returned to the source of ultrasonic wave energy and received and interpreted in the manner well known to those skilled in the art.

For a complete understanding of the invention, reference may be had to the accompanying figures, in which.

Figure 1:
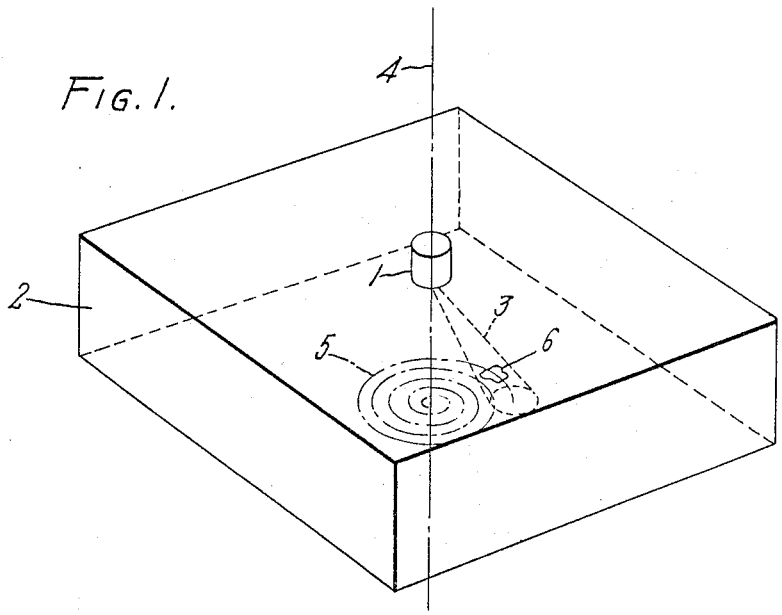
FIG. 1 shows, in diagrammatic form, the manner of non-destructive testing in accordance with the present invention.

FIG. 1 shows a non-destructive testing arrangement according to the present invention in which a source of ultrasonic wave energy 1 is positioned in ultrasonic energy transferring relation with an object 2 under test. The ultrasonic wave energy source 1 projects a beam 3 of ultrasonic wave energy into the object 2. In accordance with the present invention, the beam 3 is projected into the object 2 at a continuously variable angle with respect to the axis 4 which is normal to the point of contact of the source 1 and the object 2. In accordance with the presently preferred embodiment of the invention, the beam 3 is swept through a spiral pattern in the object 2 such that the center line of the beam 3 traces a spiral path 5 on the bottom surface of the object 2. The beam 3 thus traces a spiro-conical pattern within the object. The source 1 may be moved over the surface of the object 2 such that at some point of its travel, the center line of the beam 3 is normal to any discontinuity which may be in the object 2, regardless of the orientation of the discontinuity, within the angulation limits of the search unit.

The operation of the arrangement of FIG. 1 is as follows: The soure 1 may include a transducer (not shown in this figure) in which an ultrasonic electrical signal from any suitable source (not shown in this figure) is converted into ultrasonic wave energy and is transmitted into the object 2 in the form of the beam 3. The beam 3 is directed so as to trace a spiro-conical pattern in any suitable manner, several specific examples of which will be subsequently described as variant forms of the invention. When the beam sweeps through a discontinuity or flaw 6 in the object 2, ultrasonic wave energy is reflected by the discontinuity 6 and is returned to the transducer in the source 1. The transducer then converts the reflected ultrasonic wave energy into an electrical signal, which may be connected to any of the suitable detection units (not shown in this figure) known to those skilled in the art from which an information signal indicating the nature of the discontinuity 6 may be obtained.

Figure 2:
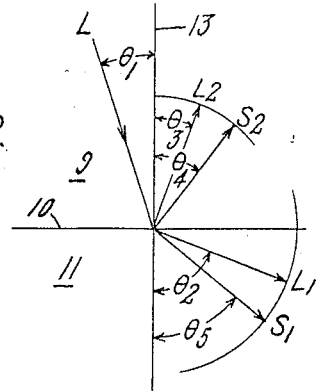
FIG. 2 shows, in diagrammatic form, the relation of transmitted and reflected ultrasonic wave energy when a beam of ultrasonic wave energy is directed onto an interface surface between two media.

Before discussing the particular apparatus for effecting the present invention, it may be helpful to consider the reflection and transmission characteristics of an ultrasonic wave when passing through an interface between two solid media. Fig. 2 shows, in diagrammatic form, a longitudinal ultrasonic wave L, traversing through a medium 9 and striking an interface 10 bounding the medium 9 and a second medium 11. A longitudinal ultrasonic wave component $L_1$ is generated at the interface 10, and proceeds into medium 11 as does a transmitted shear wave component $S_1$. Also, a reflected longitudinal wave component $L_2$ is generated from the interface 10 as is a reflected shear wave component $S_2$. The incident longitudinal wave L forms an angel $\theta_1$ with respect to the axis 13 which is normal to the interface 10, and the transmitted longitudinal wave component $L_1$ forms an angle $\theta_2$ with the axis 13. The transmitted shear wave component $S_1$ forms an angle $\theta_5$ with the axis 13. The reflected longitudinal wave component $L_2$ forms an angle $\theta_3$, equal to $\theta_1$, with respect to the axis 13, and the reflected shear wave forms an angle $\theta_4$ with the axis 13.

As is well known to those skilled in the art, the relation between these angles may be obtained from the expression:

$$\frac{\sin \theta_1}{V_1} = \frac{\sin \theta_2}{V_2} = \frac{\sin \theta_3}{V_1} = \frac{\sin \theta_4}{VS_1} = \frac{\sin \theta_5}{VS_2}$$

where:

$V_1$ = Velocity of propagation of longitudinal waves in medium 9

$V_2$ = Velocity of propagation of longitudinal waves in medium 11

$VS_1$ = Velocity of propagation of shear waves in medium 9

$VS_2$ = Velocity of propagation of shear waves in medium 11

The energy associated with each of these wave components may be computed from a set of continuity equations developed by C. G. Knott in a paper entitled, "Reflection and Refraction of Elastic Waves with Seismological Applications," published in Philosophical Magazine, vol. 48, July 1899, and is dependent upon the interface 10 and the angle of incidence $\theta_1$. It is known that each of these wave components in the general case exists at all angles of incidence other than normal. However, it may be shown that if $V_1$ equals $V_2$ or is very nearly equal $V_2$, the energy associated with the transmitted shear wave $S_1$ is for practical purposes negligible and will not be detected by normal instrumentation. Thus, by choosing materials such that $V_1$ is equal to or nearly equal to $V_2$, the transmitted shear component $S_1$ may be for practical purposes eliminated and only a longitudinal wave exists in medium 11, even at relatively high incident angles. In some applications, it is necessary that the transmitted longitudinal wave $L_1$ be refracted toward the normal axis 13. This may be accomplished by choosing materials such that $V_1$ is greater than $V_2$.

The spiral scan motion described in FIG. 1 can be obtained by a number of suitable means, among which are the following:

(1) Continuously scanning the transducer with a spiral motion over the surface of a hemispherical contact shoe of suitable material and dimension.

(2) Continuously scanning the transducer circumferentially over a semi-cylindrical surface of a contact shoe and simultaneously rotating the shoe relative to the object to be tested.

(3) Continuously scanning the transducer circumferentially over a quarter cylindrical surface of a contact shoe and simultaneously rotating the shoe relative to the object to be tested.

While each of these will give the desired spiral scanning motion, it is desirable to provide some means to attenuate the reflected components, that is, the component $L_2$ and $S_2$ shown in FIG. 2. These components, unless attenuated, return to the transducer as spurious echoes and mask a large portion of the signal reflected from any flaw in the object 2.

Figure 3:
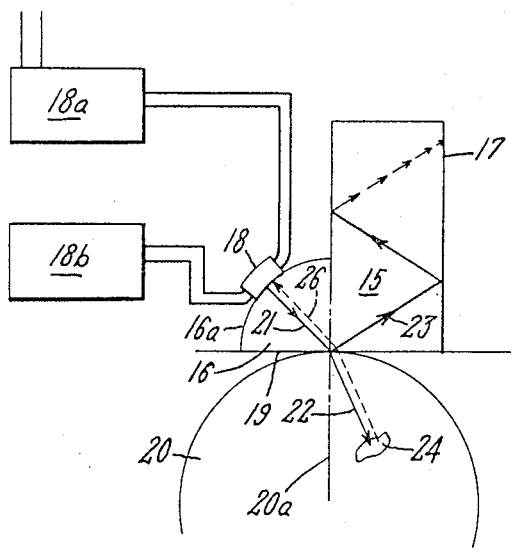
FIG. 3 shows a member for transmitting ultrasonic energy from a source of ultrasonic energy to an object under test, in accordance with one aspect of the present invention.

FIG. 3 shows a member or composite shoe-wave trap unit 15 for coupling ultrasonic wave energy from a transducer to the object under test, which, in accordance with one aspect of the present invention, both effects the spiral scanning motion described in FIG. 1 and attenuates undesired reflection signals before they are returned to the transducer. The unit 15 includes a quarter cylindrical shoe section 16 and a wave trap portion 17. A suitable electromechanical transducer 18, which may be barium titanate, having one surface thereof ground to the same radius as the quarter cylindrical section 16, is fitted against the arcuate or quarter cylindrical surface 16a. The transducer 18 receives ultrasonic electrical signals from any suitable source 18a and converts these signals into ultrasonic wave energy. The ultrasonic wave energy 21 is transmitted through the unit 15 and the object 20 under test, at which point a portion 22 of the ultrasonic wave energy is transmitted into the object 20 and the remainder 23 is reflected from the interface 19 into the wave trap portion 17 of the unit 15. Any discontinuity or flaw 24 in the object 20 will reflect the ultrasonic wave energy 26 to the transducer 18. Any suitable detection unit 18b may be connected to transducer 18 to produce an information signal indicating the presence of the discontinuity 24.

In accordance with the presently preferred embodiment of the invention, the material for the unit 15 is chosen such that the unit 15 exhibits a slightly higher velocity of propagation for ultrasonic wave energy in the region of the interface 19 than does the material of the object 20.

Thus, as previously described, refraction of the ultrasonic wave energy 22 is toward the normal axis 20a, as illustrated in FIG. 3, and no appreciable shear waves are generated, the waves existing in object 20 being principally longitudinal. If desired, any suitable coupling means, such as an oil film or others known to those skilled in the art, may be utilized at the interface 19 between the unit 15 and the object 20 under test.

The spiral scanning motion of the transmitted longitudinal ultrasonic wave 22 in object 20 is obtained by moving the transducer 18 over the surface 16a of quarter cylindrical section 16 in a plane perpendicular to the axis of the cylindrical section 16, while simultaneously rotating the unit 15 relative to the object 20 about axis 20a. By suitably correlating both movements, the transmitted wave 22 will be caused to describe a continuously increasing angle with respect to an axis normal to the interface 19, while at the same time being rotated about the axis so as to produce the path 5 of FIG. 1. The transmitted wave 22 thus traces a spiro-conical pattern in the object 20. For example, in practice it has been found feasible to move the transducer 18 through 12° of the surface 16a for each complete revolution of the unit 15, and to reverse the operation when the transducer 18 has moved over 60° of the surface 16a, thereby providing five spiral revolutions in each scanning motion.

The means by which the coordinated movement between the transducer 18 along the surface 16a and the rotation of the unit 15 relative to the object 20 is obtained is immaterial to the present invention, and any suitable means, such as a suitable manual or power-driven gearing arrangment, may be utilized to practice the present invention.

In accordance with another feature of the present invention as previously described in connection with FIG. 3, the reflected wave energy 23 from the interface 19 is directed into the wave trap portion 17 of the unit 15, in which wave trap portion the reflected energy 23 is attenuated before it can return to the transducer 18 to provide undesirable signals. The attenuation is effected by constructing the unit 15 such that, in the quarter cylindrical section 16 and the lower section of the wave trap portion 17, the unit 15 exhibits low ultrasonic attenuation, whereas in the upper portions of the wave trap portion 17, the unit material attenuates the reflected ultrasonic energy 23 rapidly. The transition from a region of low ultrasonic attenuation to the region of high ultrasonic attenuation is accomplished continuously and without any discontinuity of acoustical impedance at the wave length utilized so as to avoid any further internal reflections.

These seemingly incompatible properties may be obtained in a properly processed unit formed from a ceramic material, such as the alumina ceramics sold under the trade names "Linde A" or "Norton 38–900."

The Linde A material, found to produce satisfactory results, consists of a very fine (0.3 micron) and pure (99+%) aluminum oxide obtained by controlled calcination of an aluminum sulphate compound. The unit 15 may be prepared by isostatically pressing the finely divided ceramic powder and preferring the substance at approximately 1100° C. This results in a porous, soft, chalk-like substance with low acoustic velocity which attenuates ultrasonic energy rapidly. The material in this form may be suitably machined to the desired dimensions. Any subsequent firing at elevated temperatures will produce a hard, pore-free material with high acoustic velocity and low attenuation of ultrasonic energy. The degree of hardness, porosity, acoustic velocity and attenuation is dependent on the temperature at which the ceramic is finally fired.

By using a special "gradient firing technique," the previously described, continuously varying, ultrasonic attenuation may be effected. This varying attenuation permits the gradual absorption of the reflected wave 23 in the wave trap section 17 and prevents the return of any ultrasonic energy to the transducer 18.

The gradient firing technique may be effected, for example, by heating the lower end of the unit 15, including the quarter cylindrical section 16, to a suitable high temperature while leaving the upper end of the wave trap portion 17 at a low temperature. This may be effected, for example, by positioning the lower end in an induction heating coil while allowing the upper end to protrude from the heating coil. The lower heated end becomes dense, as was previously described, such that the acoustic velocity is high and the attenuation low in the region near interface 19. Thus, the velocity of propagation of longitudinal waves in the quarter cylindrical section 16 of the unit 15 may be made equal to or slightly higher than the velocity of the propagation of these waves in the object under test 20, which may be for example steel. This, as was previously discussed, reduces the energy of the shear wave component in object 20 to a negligible value and permits continuous angular scanning with a longitudinal ultrasonic beam.

Again referring to the heat treatment, due to the poor heat transmitting characteristics of the ceramic material, the upper end portion 17 of unit 15 does not become highly heated, but instead the firing temperature of the unit 15 will continuously vary from a high at the lower region thereof to a low at the upper region thereof, thereby effecting the desirable continuously varying ultrasonic attenuation properties of the wave trap portion 17 of the unit 15.

The wave trap member, and the gradient firing technique for producing it, are described more particularly in the copending application, Serial No. 254,328 filed January 28, 1963, now Patent No. 3,189,767, in the names of Richard G. Goldman and William R. Marklein and assigned to the assignee of the present application.

While the invention has thus been disclosed and the presently preferred embodiment described, it is not intended that the invention be limited to the shown embodiments. Instead, many modifications will occur to those skilled in the art which lie within the spirit and scope of the present invention. It is intended that the invention be limited in scope only by the appended claims, wherein the inventive concept of the present invention is set forth with particularity.

Having thus described the invention, what is claimed is:

1. A method of inspecting an object for defects comprising, generating a beam of ultrasonic waves by means of a transducer, directing the beam by moving the transducer so as to trace a spiro-conical pattern in the object, and measuring the reflected energy.

2. A method of inspecting an object for defects comprising, generating a beam of ultrasonic waves, directing the beam into the object at a continuously variable angle relative to an axis normal to a surface of the object, simultaneously rotating the beam about said axis, and measuring the reflected energy.

3. A method of inspecting an object for defects comprising, generating an ultrasonic electrical signal, converting said signal to ultrasonic wave energy by means of a transducer, providing a composite shoe-wave trap unit having an arcuate surface in contact with the transducer and a second surface in contact with the object, directing the energy through said unit to a surface of the object which is in contact with the second surface of said unit, moving said transducer circumferentially along the arcuate surface of said unit while simultaneously rotating said unit about an axis normal to the second surface so as to trace a spiro-conical pattern in the object, and measuring the energy reflected from the object for identifying any defects in the object.

References Cited by the Examiner

UNITED STATES PATENTS

| 2,707,755 | 5/1955 | Hardie et al. | 310—8.2 |
| 3,033,029 | 5/1962 | Weighart | 73—67.8 |
| 3,086,390 | 4/1963 | Brown | 73—67.8 |
| 3,186,216 | 6/1965 | Dickenson | 73—67.5 |
| 3,189,767 | 6/1965 | Goldman et al. | 310—8.2 |

FOREIGN PATENTS

| 1,065,907 | 1/1954 | France. |
| 766,984 | 1/1957 | Great Britain. |
| 722,083 | 4/1957 | Great Britain. |
| 783,965 | 10/1967 | Great Britain. |
| 149,935 | 9/1962 | Russia. |

RICHARD C. QUEISSER, *Primary Examiner.*

JOHN P. BEAUCHAMP, *Examiner.*